United States Patent
Ribreau et al.

(10) Patent No.: US 11,325,433 B2
(45) Date of Patent: May 10, 2022

(54) METHOD FOR RECONFIGURING A DEVICE FOR MONITORING A MOTOR VEHICLE TYRE

(71) Applicants: Continental Automotive France, Toulouse (FR); Continental Automotive GmbH, Hannover (DE)

(72) Inventors: Davy Ribreau, Toulouse (FR); Jean-Philippe Boisset, Toulouse (FR); Michael Löffler, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 1 day.

(21) Appl. No.: 17/058,758

(22) PCT Filed: May 27, 2019

(86) PCT No.: PCT/FR2019/051219
§ 371 (c)(1),
(2) Date: Nov. 25, 2020

(87) PCT Pub. No.: WO2019/229343
PCT Pub. Date: Dec. 5, 2019

(65) Prior Publication Data
US 2021/0206211 A1    Jul. 8, 2021

(30) Foreign Application Priority Data
May 31, 2018    (FR) ........................................ 1854671

(51) Int. Cl.
*B60C 23/00* (2006.01)
*B60C 23/04* (2006.01)
(Continued)

(52) U.S. Cl.
CPC ........ *B60C 23/0479* (2013.01); *B60C 11/246* (2013.01); *B60C 23/0462* (2013.01); *B60C 2019/004* (2013.01)

(58) Field of Classification Search
CPC ............... B60C 23/0479; B60C 11/246; B60C 23/0462; B60C 2019/004; B60C 23/0415; H04L 67/12
See application file for complete search history.

(56) References Cited

U.S. PATENT DOCUMENTS 4,589,063 A * 5/1986 Shah .................... G06F 12/0661
                                                     710/62
5,768,499 A * 6/1998 Treadway ............... G06F 11/22
                                                     714/26
(Continued)

FOREIGN PATENT DOCUMENTS

EP          3118030 A1    1/2017
WO      2008022677 A1    2/2008

OTHER PUBLICATIONS

International Search Report and Written Opinion for International Application No. PCT/FR2019/051219, dated Aug. 28, 2019, 8 pages.

(Continued)

*Primary Examiner* — Munear T Akki
(74) *Attorney, Agent, or Firm* — RatnerPrestia

(57) ABSTRACT

A method for reconfiguring a device for monitoring a tire, incorporating a pressure sensor and a communication module. The device may receive and store configuration data intrinsic to the tire. Based on pressure measurements and the configuration data, the device generates and stores advanced data relating to use of the tire over time. Following reception of new configuration data, the method includes: detecting a tire change based on the previously stored configuration data and the newly received configuration data, if a tire change is (Continued)

detected: erasing the advanced data from the memory means of the device, if not, retaining the advanced data in the memory of the device.

13 Claims, 3 Drawing Sheets

(51) Int. Cl.
*B60C 11/24* (2006.01)
*B60C 19/00* (2006.01)

(56) References Cited

U.S. PATENT DOCUMENTS

| | | | | |
|---|---|---|---|---|
| 6,141,792 | A * | 10/2000 | Acker | G06F 8/47 717/116 |
| 6,259,361 | B1 * | 7/2001 | Robillard | B60C 23/0416 116/34 R |
| 6,477,165 | B1 * | 11/2002 | Kosco | G06F 13/423 370/389 |
| 7,318,162 | B2 * | 1/2008 | Rineer | G06F 21/645 707/999.101 |
| 7,900,198 | B2 * | 3/2011 | Kasman | G06F 8/36 717/158 |
| 2002/0113691 | A1 * | 8/2002 | LeMense | B60C 23/0416 340/442 |
| 2005/0104722 | A1 * | 5/2005 | Tang | B60C 23/0471 340/445 |
| 2009/0033478 | A1 * | 2/2009 | Deniau | B60C 23/0479 340/442 |
| 2009/0231114 | A1 * | 9/2009 | Yu | B60C 23/0408 340/447 |
| 2017/0015151 | A1 * | 1/2017 | Bill | B60C 23/0479 |
| 2019/0337340 | A1 * | 11/2019 | Wu | B60C 23/0408 |
| 2020/0361253 | A1 * | 11/2020 | Qiu | B60C 23/0472 |

OTHER PUBLICATIONS

International Search Report and Written Opinion for International Application No. PCT/FR2019/051219, dated Aug. 28, 2019, 12 pages (French).

* cited by examiner

METHOD FOR RECONFIGURING A DEVICE FOR MONITORING A MOTOR VEHICLE TYRE

CROSS REFERENCE TO RELATED APPLICATIONS

This application is the U.S. National Phase Application of PCT International Application No. PCT/FR2019/051219, filed May 27, 2019, which claims priority to French Patent Application No. 1854671, filed May 31, 2018, the contents of such applications being incorporated by reference herein.

FIELD OF THE INVENTION

The present invention relates to a device for monitoring a motor vehicle tire, incorporating a pressure sensor. The invention relates in particular to a method for reconfiguring such a monitoring device.

BACKGROUND OF THE INVENTION

For several years now, monitoring devices incorporating pressure sensors have been capable of providing information about the pressure of a motor vehicle tire, whether the vehicle is in motion or is stationary, in order to detect any loss of tire pressure and to alert the driver if the tire pressure is too low.

Such monitoring devices thus make it possible not only to prevent the risk of an accident linked to driving with an underinflated tire, but also to maintain an optimum pressure in the tires of a vehicle, thereby making it possible to extend the service life of the tires, to reduce fuel consumption and, consequently, to reduce polluting emissions such as the creation of carbon dioxide for example.

More recently, such monitoring devices have started to incorporate additional intelligent functions making it possible to generate advanced data relating to the use of the tire throughout its life cycle. This is for example information relating to the mileage of the tire, its state of wear, or else the load to which it is subjected. These advanced data are stored within the monitoring device. They may also be sent to an on-board computer of the vehicle, for example in order to alert the driver if any danger is detected on the basis of these advanced data, and in particular if it is necessary to replace an excessively worn tire.

As such monitoring devices are relatively expensive, they are generally not incorporated permanently into a tire. On the contrary, they are removable and may be detached from a tire in order to be attached to another replacement tire.

However, existing monitoring devices do not make it possible to optimally manage the stored advanced data throughout the various events that may take place during the life cycle of the device: replacement of the tire, repair of the tire, significant deflation followed by reinflation of the tire, etc.

SUMMARY OF THE INVENTION

An aspect of the present invention aims to rectify all or some of the drawbacks of the prior art, in particular those described above, by proposing a method making it possible to optimize the management of the advanced data of a device for monitoring a motor vehicle tire during the life cycle of said device. Such a method aims to keep, in a memory of the device, advanced data that are consistent with the tire with which said device is associated. The method also aims to limit any interventions by a human operator (vehicle owner, motor vehicle technician, etc.).

To this end, and according to a first aspect, the present invention relates to a method for reconfiguring a device for monitoring a motor vehicle tire. Said monitoring device comprises:
- a communication module for receiving data, called "configuration data", describing characteristics of said tire,
- a pressure sensor making it possible to measure a pressure inside the tire,
- a processing module making it possible to determine, based on pressure measurements and the configuration data, data, called "advanced data", representative of a history of use of the tire over time,
- a memory making it possible to store the configuration data and the advanced data.

Following reception of new configuration data, the method comprises:
- detecting a tire change based on the previously stored configuration data and the received new configuration data,
- if a tire change is detected: erasing the advanced data from the memory,
- if a tire change is not detected: retaining the advanced data in the memory.

Such provisions make it possible to keep, in the memory of the monitoring device, advanced data that are consistent with the tire with which said device is associated, in particular in cases where the tire with which the monitoring device is associated is repaired or replaced.

In particular modes of implementation, an aspect of the invention may furthermore comprise one or more of the following features, taken alone or in any technically feasible combination.

In particular modes of implementation, a tire change is detected through a comparison between a check code calculated based on the previously stored configuration data and a check code calculated based on the received new configuration data.

In particular modes of implementation, detecting a tire change furthermore comprises transmission, via the communication module, of a request to confirm that the tire has not been changed if the check code calculated based on the previously stored configuration data is identical to the check code calculated based on the received new configuration data.

Such a confirmation may prove to be necessary for example if it is not possible to uniquely identify a tire based on the information contained in the configuration data.

In particular modes of implementation, the method furthermore comprises transmission, via the communication module, of a request to send new configuration data when a pressure measured inside the tire successively passes below a first predetermined threshold and then above a second predetermined threshold.

Such provisions allow the monitoring device to automatically detect that a tire change has probably taken place, and to trigger reconfiguration of the monitoring device.

In particular modes of implementation, the method furthermore comprises:
- invalidating the advanced data if a pressure measured inside the tire passes below the first predetermined threshold,
- revalidating the advanced data when retaining the advanced data.

Thus, when the monitoring device automatically detects that a tire change has probably taken place, the stored advanced data are invalidated until new configuration data are received.

Invalidated advanced data are not erased. The monitoring device may continue to update them in the event that there has not been a tire change. On the other hand, for as long as they are invalidated, an on-board computer may take into account the fact that there is uncertainty with regard to the relevance of the advanced data.

Upon reception of new configuration data, the advanced data will be either revalidated or erased, depending on whether or not there has been a tire change.

In particular modes of implementation, the advanced data comprise one or more of the following elements:
 a date when the tire was put into service,
 a datum representative of a level of wear of the tire,
 a mileage of the tire,
 a number of punctures suffered by the tire,
 a number of excessive loads to which the tire has been subjected.

In particular modes of implementation, the method comprises, following the retention of the advanced data, transmission, via the communication module, of a request to send a current date.

According to a second aspect, the present invention relates to a device for monitoring a motor vehicle tire, comprising:
 a communication module for receiving data, called "configuration data", describing characteristics of said tire,
 a pressure sensor making it possible to measure a pressure inside the tire,
 a processing module making it possible to determine, based on pressure measurements and the configuration data, data, called "advanced data", representative of a history of use of the tire over time,
 a memory making it possible to store the configuration data and the advanced data.

The device is configured so as, following reception of new configuration data, to:
 detect a tire change based on the previously stored configuration data and the received new configuration data,
 if a tire change is detected: erase the advanced data from the memory,
 if a tire change is not detected: retain the advanced data in the memory.

In particular embodiments, the invention may furthermore comprise one or more of the following features, taken alone or in any technically feasible combination.

In particular embodiments, said device is configured so as, in order to detect a tire change, to compare a check code calculated based on the previously stored configuration data with a check code calculated based on the received new configuration data.

In particular embodiments, said device is furthermore configured so as to transmit, via the communication module, a request to send new configuration data when a pressure measured inside the tire successively passes below a first predetermined threshold and then above a second predetermined threshold.

In particular embodiments, said device is furthermore configured so as to:
 invalidate the advanced data if a pressure measured inside the tire passes below the first predetermined threshold,
 revalidate the advanced data when retaining the advanced data.

In particular embodiments, the advanced data comprise one or more of the following elements:
 a date when the tire was put into service,
 a datum representative of a level of wear of the tire,
 a mileage of the tire,
 a number of punctures suffered by the tire,
 a number of excessive loads to which the tire has been subjected.

BRIEF DESCRIPTION OF THE DRAWINGS

An aspect of the invention will be better understood upon reading the following description, given by way of entirely non-limiting example and with reference to FIGS. 1 to 3, in which.

Figure 1:
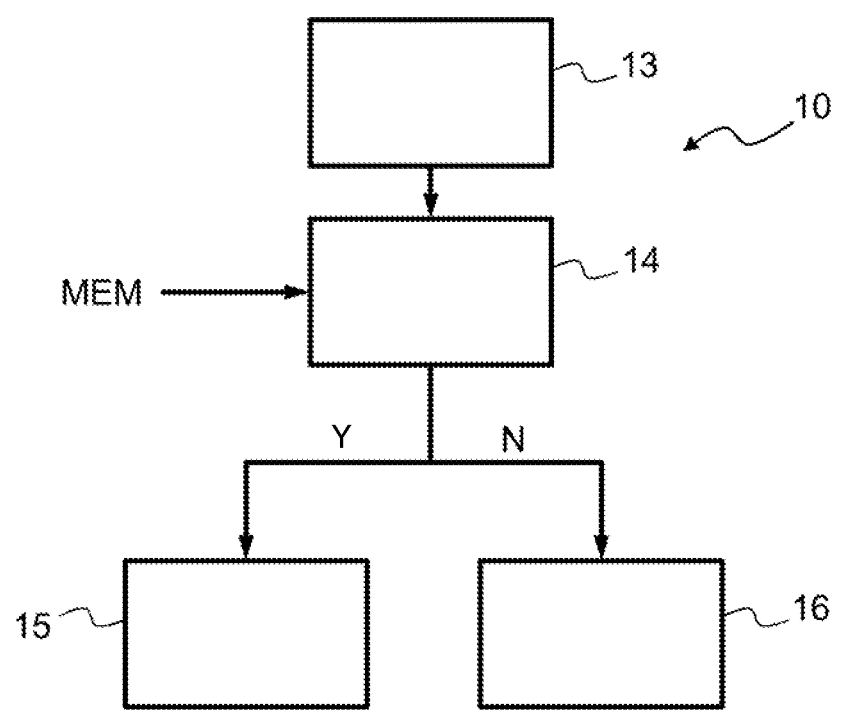
FIG. 1 shows the main steps of a method for reconfiguring a monitoring device for a tire.

In these figures, references that are identical from one figure to the next denote identical or analogous elements. For the sake of clarity, the elements that are shown are not necessarily to the same scale, unless stated otherwise.

DETAILED DESCRIPTION OF THE PREFERRED EMBODIMENTS

As indicated above, an aspect of the present invention relates to a method making it possible to optimize the management of advanced data of a monitoring device for a motor vehicle tire.

In the remainder of the description, consideration is given, without limitation, to the case of a monitoring device that may be attached to the tread inside a tire.

Such a monitoring device comprises for example:
 a pressure sensor making it possible to measure a pressure inside the tire,
 an electronic memory,
 a communication module,
 a processing module.

The communication module comprises wireless communication means, considered to be known to those skilled in the art, making it possible in particular to receive data, called "configuration data", describing characteristics of the tire with which the monitoring device is associated.

The configuration data comprise for example the manufacturing date of the tire, the manufacturing location of the tire, a serial number making it possible to uniquely identify the tire or else at least making it possible to identify a manufacturing batch to which the tire belongs, information about the geometry of the tire (for example its internal diameter, its external diameter, etc.), the type of rubber, the thickness of the rubber, whether it is a summer or winter tire, etc.

The received configuration information is stored in the electronic memory of the monitoring device in order to be able to be used later if necessary.

It should be noted that, in the example under consideration, the memory of the monitoring device has an electronic medium. However, there is nothing that would prevent the use of other types of memory, in particular memories with a magnetic or optical medium.

In particular embodiments, the communication module comprises means configured so as to allow direct pairing by radio over a short distance between the monitoring device and an apparatus for configuring the monitoring device. For example, the communication module implements a wireless communication technology based on protocols such as Bluetooth, Zigbee, Wi-Fi, etc. These protocols make it possible to establish what is known as "ad hoc" communication directly between the monitoring device and the configuration apparatus without using a network infrastructure, that is to say without using an access point or an intermediate base station. The apparatus for configuring the monitoring device may be a mobile telephone or a tablet on which a specific application has been installed, or else an electronic apparatus dedicated to configuring the monitoring device. When the monitoring device is attached to a tire, the configuration apparatus is used to transmit, to the monitoring device, the configuration data relating to the tire to which the monitoring device is attached. The received configuration information is then stored in the electronic memory of the monitoring device.

In particular embodiments, the communication module comprises means configured so as to communicate with a server via a wireless wide area network, such as for example a GSM, UMTS or LTE cellular network. In such a case, it is possible to configure the monitoring device remotely using a cloud computing application (as it is known in the literature). The configuration data for the monitoring device are for example communicated to a remote server, which may communicate them in turn to the monitoring device via the wireless wide area network. In this case too, the configuration information received by the monitoring device is then stored in the electronic memory of the device.

The communication module may also comprise means for wireless communication between the monitoring device and an on-board computer of the motor vehicle. Such provisions may for example make it possible to communicate, to the on-board computer, information about the pressure measured inside the tire in order to detect any drop in pressure and to alert the driver if the tire pressure is too low.

The processing module comprises for example one or more processors capable of executing a computer program product in the form of a set of program code instructions. The computer program is for example stored in the electronic memory of the monitoring device.

As an alternative or in addition, the processing module comprises one or more programmable logic circuits (FPGA, PLD, etc.), and/or one or more specialized integrated circuits (ASIC), and/or a set of discrete electronic components, etc.

In other words, the processing module comprises a set of means configured in the form of software (specific computer program product) and/or hardware (FPGA, PLD, ASIC, discrete electronic components, etc.) in order to implement various algorithms making it possible in particular, based on the pressure measurements provided by the pressure sensor, on the one hand, and based on the configuration data, on the other hand, to generate data, called "advanced data", relating to use of the tire over time.

The advanced data comprise for example information about a level of wear of the tire. It is specifically possible to determine, based on the pressure measurements of the tire, variations in the running characteristics of the tire. These gradual changes in the running characteristics of the tire may then make it possible to deduce a rubber thickness of the tread. Where applicable, information indicating that the rubber thickness of the tread has passed below a predetermined threshold value may be communicated to the on-board computer in order to signal to the driver that a tire change should be performed. As an alternative or in addition, this information may be communicated to a local motor vehicle service center using the communication module and via a wireless wide area network.

According to another example, the advanced data may comprise information about excessive loads to which the tire has been subjected. It is specifically possible to detect a change in rolling characteristics caused by an excessive load. It is then possible to count a number of excessive loads to which the tire has been subjected over its life. It is therefore possible to contemplate adapting certain driver assistance functions on the basis of the vehicle load.

According to yet another example, the advanced data may comprise a mileage of the tire since it was put into service. Specifically, an accelerometer may be incorporated into the monitoring device in order to determine, on the basis of the configuration data relating to the geometry of the tire, and in particular its diameter, a distance covered by the tire.

Other advanced data may also be generated by the processing module, in particular data relating to the age of the tire, to a number of punctures suffered by the tire, etc.

The advanced data are themselves also stored in the electronic memory of the monitoring device. They are updated as the processing module determines new values for these advanced data. They may be communicated to the on-board computer of the vehicle and/or to a motor vehicle maintenance center, in particular in order to monitor the state of the tire and raise an alert if a tire change becomes necessary.

It is important that the advanced data stored within the monitoring device are always consistent with the tire to which the device is attached. In particular, when a tire change is made, it is necessary to reinitialize the advanced data. Conversely, when a tire is repaired, it is necessary to retain the advanced data previously generated for this tire.

The remainder of the description describes a method for reconfiguring the monitoring device making it possible to optimize the management of the advanced data of the device. Such a method may for example be implemented by the processing module of the monitoring device.

FIG. 1 shows the main steps of such a method 10.

A step 13 of reception of new configuration data by the communication module of the monitoring device triggers a step 14 of detecting a tire change. This involves determining whether the monitoring device is now associated with a new tire, or whether it is still associated with the same tire. This detection 14 of a tire change is performed based on the previously stored configuration data MEM in the memory of the monitoring device, on the one hand, and based on the new configuration data that have just been received by the communication module of the monitoring device, on the other hand. This step will be described in more detail later on with reference to FIG. 3.

The new configuration data received by the communication module in step 13 may for example originate from direct wireless communication between the monitoring device and a configuration apparatus used by a motor vehicle technician who is repairing or changing the tire with which the device is associated.

According to another example, the new configuration data received by the communication module in step 13 may originate from a remote server via a wireless wide area network. The remote server has for example previously obtained the information that the tire has been changed or repaired for this monitoring device via an Internet application used by the technician.

If a tire change is detected, then the method 10 performs a step 15 of erasing the advanced data from the memory of the monitoring device. The advanced data generated by the processing module for the tire with which the monitoring device was previously associated are then erased or reinitialized to a default value indicating that no information is available.

If, on the other hand, a tire change is not detected, then the method 10 performs a step 16 of retaining the advanced data. In other words, the advanced data that are in memory are neither erased nor reinitialized, and they continue to apply for the tire associated with the monitoring device.

It may be advantageous for the monitoring device to autonomously detect that a tire change has probably taken place. In such a case, the monitoring device may then transmit a request to transmit new configuration data in order for the device to be reconfigured.

If the monitoring device autonomously detects that a tire change has probably taken place, the monitoring device may also be configured so as to consider that the stored advanced data are no longer valid until the monitoring device receives new configuration data.

However, invalidated advanced data are not erased or reinitialized. On the contrary, the monitoring device may continue to update these advanced data, under the assumption for example that there has not been a tire change. On the other hand, for as long as they are invalidated, the on-board computer will be able to take into account the fact that there is uncertainty with regard to the relevance of the advanced data for the various intelligent functions that it implements.

Ultimately, the advanced data may either be revalidated, for example if it is subsequently determined that it is indeed still the same tire that is associated with the monitoring device, or be erased, for example if it is subsequently determined that the monitoring device is associated with a new tire.

Figure 2:
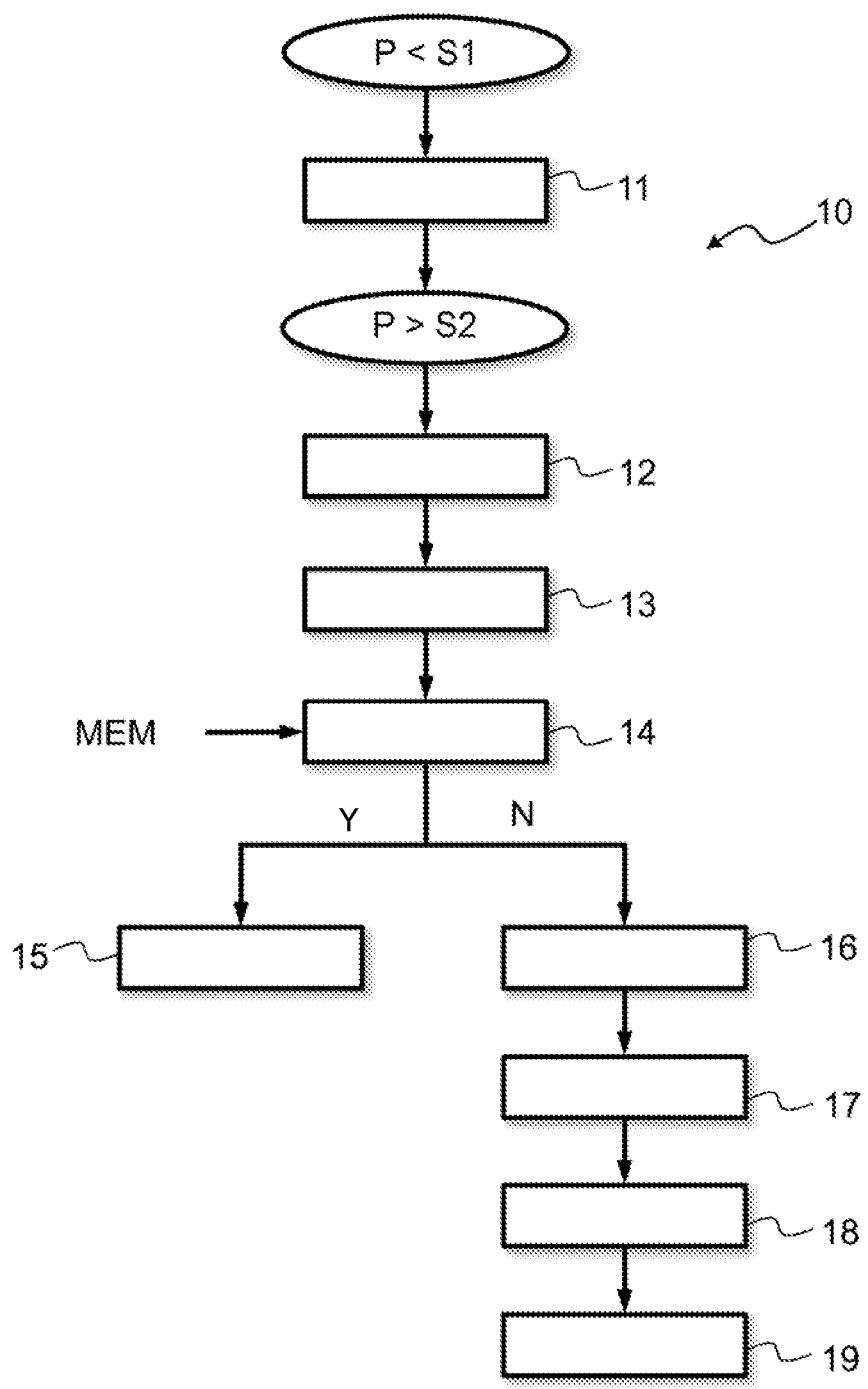
FIG. 2 shows the main steps of one particular mode of implementation of the method according to an aspect of the invention.

FIG. 2 shows the main steps of one particular mode of implementation of the method 10 according to an aspect of the invention.

When the internal tire pressure measured by the pressure sensor is less than a first predetermined threshold S1, the method 10 performs a step 11 of invalidating the advanced data stored in the memory of the monitoring device. The first threshold S1 is for example chosen such that, if the tire pressure is less than this threshold, it is highly probable that the tire is punctured or that it has been removed. Invalidating 11 the advanced data consists for example in setting a Boolean variable to a certain value (for example the value 0) indicating that the advanced data are not valid.

When the pressure measured by the pressure sensor passes back above a second predetermined threshold S2, this corresponding to the tire being repressurized, then the communication module of the monitoring device sends a request 12 to send new configuration data. The first threshold S1 and the second threshold S2 may have the same value, or else they may have different values.

This request 12 is transmitted for example to a configuration apparatus of a technician, or else to a remote server via a wireless wide area network (the request then being able to be transmitted to the technician or to the vehicle owner via an Internet application).

Similarly to what has been described with reference to FIG. 1, reception 13 of new configuration data by the communication module of the monitoring device triggers a step 14 of detecting a tire change.

If a tire change is detected, then the method 10 performs a step 15 of erasing the advanced data from the memory of the monitoring device.

If, on the other hand, a tire change is not detected, then the method 10 performs a step 16 of retaining the advanced data. In this retention step 16, the advanced data are revalidated, otherwise the Boolean variable is set to a value (for example the value 1) indicating that the advanced data are valid.

Thus, for as long as new configuration data are not received in step 13, the advanced data in memory are invalidated. The monitoring device may nevertheless continue to update these advanced data, but it retains information, via the Boolean variable set to the value 0, that there is uncertainty with regard to the relevance of these advanced data. Ultimately, when new configuration data are received, the advanced data are revalidated if it is determined that the same tire is still involved, or else they are erased if it is determined that a new tire is involved. When the advanced data are erased, the Boolean variable is reinitialized to the value 1, such that the new advanced data that will be determined by the processing module will be considered valid.

The advanced data may comprise information about a number of punctures suffered by the tire and about a history of repairs performed on the tire. If this is the case, the method 10 may furthermore comprise the following optional steps if it is determined in step 14 that it is still the same tire that is associated with the monitoring device following the detection of depressurization (pressure <S1) and then repressurization (pressure >S2) of the tire:

transmitting a request 17 to send a current date,
storing 18 the current date in the repair history,
incrementing 19 the number of punctures suffered by the tire.

It should be noted that, in the embodiment described with reference to FIG. 2, the step 11 of invalidating the advanced data and the step of revalidating the advanced data are optional steps.

Figure 3:
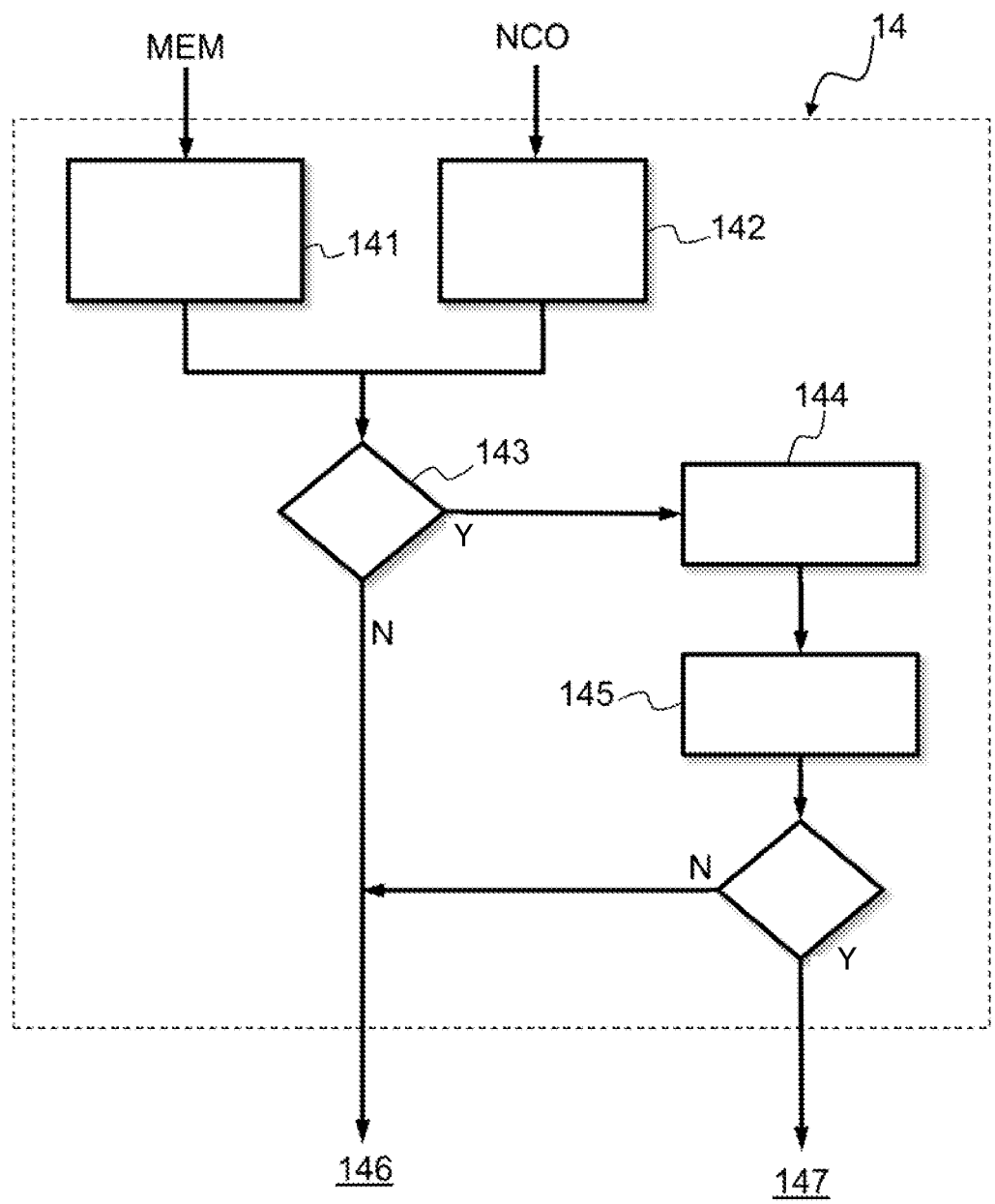
FIG. 3 shows one particular mode of implementation of a step of detecting a tire change.

FIG. 3 shows one particular mode of implementation of the step 14 of detecting a tire change. This step takes as input firstly the configuration data MEM stored in the memory of the monitoring device and secondly new configuration data NCO received by the communication module of the monitoring device.

A check code is calculated 141 based on the stored configuration data MEM. In the example under consideration and presented without limitation, the configuration data are encoded on twenty bytes and the check code is a cyclic redundancy code (CRC) calculated in a conventional manner based on these twenty bytes of data.

A check code is calculated 142 similarly based on the received new configuration data.

Next, the two check codes thus obtained are compared 143.

If the two calculated check codes are different, then this means that the stored configuration data MEM are different from the received configuration data NCO. The received configuration data NCO then correspond to a tire different from the tire to which the stored configuration data MEM correspond. In other words, this means that there has been a tire change 146.

On the other hand, if the two calculated check codes are identical, this probably means that this is the same tire. There may nevertheless still be uncertainty if the configuration data do not make it possible to uniquely identify a tire (this is the case for example if a serial number included in the configuration data corresponds to a manufacturing batch of several tires rather than to an individual tire). In such a case, it may prove necessary for the monitoring device to transmit, using the communication module, a request 144 to confirm that it is actually the same tire (and that it is not another tire happening to belong to the same manufacturing batch as the previous tire). Upon reception 145 of a confirmation transmitted for example by the technician, it is possible to determine whether there has 146 or has not 147 been a tire change.

It should be noted that, if it is possible to directly determine that there has not been a tire change when the check codes are identical (which may be the case for example if a serial number contained in the configuration data makes it possible to uniquely identify a tire), then the steps of transmitting a request 144 and of receiving confirmation 145 are not necessary. In such a case, no intervention by a human operator is necessary for this step 14 of detecting a tire change.

It should also be noted that, when using the monitoring device for the very first time, there are no configuration data in memory. In such a case, upon receiving 13 new configuration data, it is necessary for the method 10 to consider that there has been a tire change. This particular scenario is not shown in the figures.

The description above clearly illustrates that, through its various features and the advantages thereof, an aspect of the present invention achieves the set aims. In particular, the method 10 makes it possible to keep, in the memory of the monitoring device, advanced data that are consistent with the tire with which said monitoring device is associated, while at the same time limiting any interventions by a human operator.

Generally speaking, it should be noted that the modes of implementation and embodiments considered above have been described by way of non-limiting examples, and that other variants are therefore conceivable.

In particular, the configuration data may comprise information elements other than those described.

The same applies to the content of the advanced data, which is not limited to the examples given in the description.

Various methods may therefore be contemplated for calculating a check code based on configuration data. The choice of one particular method constitutes only one variant of an aspect of the invention.

An aspect of the invention has been described with consideration to a monitoring device placed on the tread inside a tire. According to other examples, however, there is nothing to rule out considering other locations for the monitoring device, such as for example on the valve of the tire.

The invention claimed is:

1. A method for reconfiguring a device for monitoring a motor vehicle tire, said device comprising:
   a communication module for receiving from a configuration device a configuration data describing characteristics of said tire,
   a pressure sensor for measuring a pressure inside the tire,
   a processing module for determining, based on pressure measurements and the configuration data, an advanced data representative of a history of use of the tire over time,
   a memory for storing the configuration data and the advanced data,
   the method comprises:
   receiving new configuration data from the configuration device; and
   determining, by the processing module, a tire change based on the previously stored configuration data and the received new configuration data,
   if a tire change is determined: erasing the advanced data from the memory, and
   if a tire change is not determined: retaining the advanced data in the memory.

2. The method as claimed in claim 1, wherein a tire change is detected through a comparison between a check code calculated based on the previously stored configuration data and a check code calculated based on the received new configuration data.

3. The method as claimed in claim 2, wherein detecting a tire change furthermore comprises transmission, via the communication module, of a request to confirm that the tire has not been changed if the check code calculated based on the previously stored configuration data is identical to the check code calculated based on the received new configuration data.

4. The method as claimed in claim 1, wherein said method furthermore comprises transmission, via the communication module, of a request to send new configuration data when a pressure measured inside the tire successively passes below a first predetermined threshold and then above a second predetermined threshold.

5. The method as claimed in claim 4, wherein said method furthermore comprises:
   invalidating the advanced data if a pressure measured inside the tire passes below the first predetermined threshold, and
   revalidating the advanced data when retaining the advanced data.

6. The method as claimed in claim 1, wherein the advanced data comprise one or more of the following elements:
   a date when the tire was put into service,
   a datum representative of a level of wear of the tire,
   a mileage of the tire,
   a number of punctures suffered by the tire,
   a number of excessive loads to which the tire has been subjected.

7. The method as claimed in claim 1, wherein said method comprises, following the retention of the advanced data, transmission, via the communication module, of a request to send a current date.

8. A device for monitoring a motor vehicle tire, comprising:
   a communication module for receiving configuration data describing characteristics of said tire,
   a pressure sensor to measure a pressure inside the tire,
   a processing module to determine, based on pressure measurements and the configuration data, advanced data representative of a history of use of the tire over time,
   a memory making it possible to store the configuration data and the advanced data, wherein the device is configured so as, following reception of new configuration data, to:
   detect a tire change based on the previously stored configuration data and the received new configuration data,
   if a tire change is detected: erase the advanced data from the memory, and
   if a tire change is not detected: retain the advanced data in the memory.

9. The device as claimed in claim 8, wherein said device is configured so as to compare, in order to detect a tire change, a check code calculated based on the previously stored configuration data with a check code calculated based on the received new configuration data.

10. The device as claimed in claim 8, wherein said device is furthermore configured so as to transmit, via the communication module, a request to send new configuration data when a pressure measured inside the tire successively passes below a first predetermined threshold and then above a second predetermined threshold.

11. The device as claimed in claim 10, wherein said device is furthermore configured so as to:
- invalidate the advanced data if a pressure measured inside the tire passes below the first predetermined threshold, and
- revalidate the advanced data when retaining the advanced data.

12. The device as claimed in claim 8, wherein the advanced data comprise one or more of the following elements:
- a date when the tire was put into service,
- a datum representative of a level of wear of the tire,
- a mileage of the tire,
- a number of punctures suffered by the tire,
- a number of excessive loads to which the tire has been subjected.

13. The device as claimed in claim 9, wherein said device is furthermore configured so as to transmit, via the communication module, a request to send new configuration data when a pressure measured inside the tire successively passes below a first predetermined threshold and then above a second predetermined threshold.

\* \* \* \* \*